C. G. STREICH.
WAGON BODY.
APPLICATION FILED FEB. 2, 1914.
1,106,524.
Patented Aug. 11, 1914.
2 SHEETS—SHEET 1.
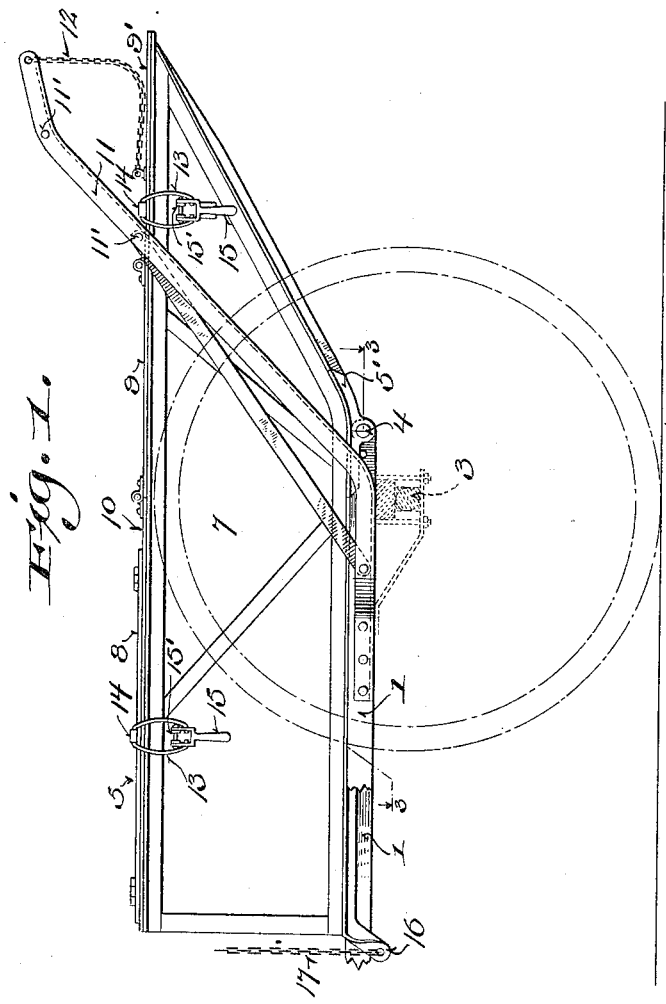
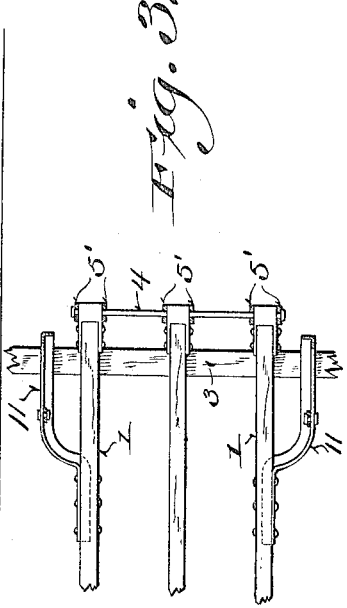
Witnesses:
Casimir Young
May Downey
Inventor:
Charles G. Streich
Oliphant & Young
Attorneys C. G. STREICH.
WAGON BODY.
APPLICATION FILED FEB. 2, 1914.
1,106,524.
Patented Aug. 11, 1914.
2 SHEETS—SHEET 2.
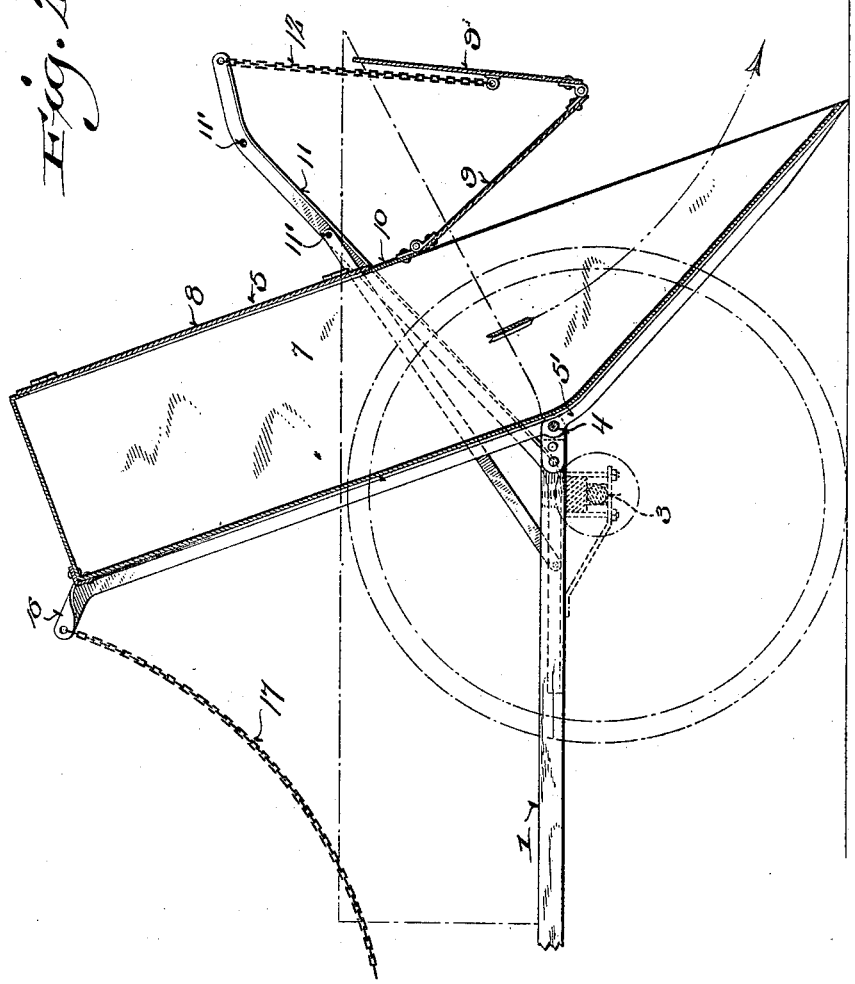

UNITED STATES PATENT OFFICE.

CHARLES G. STREICH, OF OSHKOSH, WISCONSIN.

WAGON-BODY.

1,106,524.   Specification of Letters Patent.   Patented Aug. 11, 1914.

Original application filed September 8, 1913, Serial No. 788,627. Divided and this application filed February 2, 1914. Serial No. 815,861.

*To all whom it may concern:*

Be it known that I, CHARLES G. STREICH, a citizen of the United States, and resident of Oshkosh, in the county of Winnebago and State of Wisconsin, have invented certain new and useful Improvements in Wagon-Bodies; and I do hereby declare that the following is a full, clear, and exact description thereof.

My invention refers to vehicles such as disclosed in an application for patent filed by me September 8, 1913, Serial No. 788,627 for improvements in dumping wagons, of which this application is a division, its object being to provide a simple, economical means for automatically controlling the body doors.

Specific objects of my invention are to provide a simple and effective dump-door actuating means in connection with the body-supporting frame so constructed and arranged that said door will automatically open co-incident to a dumping movement of the body and close upon a recovery movement of the same; to provide a supension frame for the door-actuating means, which frame is offset from the body frame, whereby said body frame and its body may be of approximately the same width due to the fact that the door suspension frame, while being secured to the body frame, is offset therefrom.

With the above and other minor objects in view the invention consists in certain peculiarities of construction and combination of parts as set forth hereinafter with reference to the accompanying drawings and subsequently claimed.

In the drawings Figure 1 represents a side elevation of a portion of a wagon embodying the features of my invention, the body thereof being in its loading position; Fig. 2, a sectional elevation of the same showing the body in its dumped position, and Fig. 3, a fragmentary plan view of the truck-frame and portion of the rear axle showing the offset struts for the support of an automatic door-actuating mechanism.

Referring by characters to the drawings, 1, 1, represent the side sills of a wagon truck. The truck-frame is mounted upon standard front and rear axle connections carrying the usual wheels, the rear axle 3 being shown in full lines in Fig. 3 of the drawings. The truck-frame sills just back of the rear axle 3 carry a trunnion 4, upon which trunnion the rear end of a wagon-body is pivoted, through the medium of body reinforcing straps 5'. The major portion of the wagon-body extends forwardly of its fulcrum point in order that the preponderance of weight thereof will cause said body to rest firmly upon the truck-sills. Attention is called to the fact that the body is approximately equal in width to the distance between the truck-frame sills 1, 1, and thus the full capacity of the wagon relative to its running gear is obtained. The tail end of the body, as shown, is preferably in the form of an inclined bottom chute tapering upward to the top edge of the vertically disposed body side walls 7. The forward portion of the body is closed by a pair of hinged and longitudinally disposed loading doors 8, their hinged ends being centrally disposed with relation to the body, while their free edges rest upon the juxtaposed edges of the side walls 7. The tail portion of the body is covered by a transversely disposed hinged dumping door, which dumping door is formed in two sections 9, 9'. The main section 9 is hinged to a cross-plate 10, while the mouth section 9' is hinged to the edge of the main section, the parts being so arranged to permit a folding action between said sections. Extending upwardly from the rear ends of the truck-frame side sills 1 and offset from said sills and the body is a suitably braced pair of rearwardly inclined struts 11, which struts are cross-connected above the wagon-body by tie-rods 11', 11'. The feet of the struts 11, as best shown in Fig. 3, are bowed inwardly and are secured to the side sills by a series of bolts or rivets and the bowed horizontal portion of the strut feet are arranged to rest upon and be supported by the rear axle 3. By this arrangement it may be seen that clearance between the struts is permitted, whereby the wagon-body may swing freely upon its trunnion, the said struts constituting a fixed door suspension frame.

The terminal tie-rod 11' is connected to the free end of the mouth section 9' of the dumping door by flexible connections in the form of chains 12. By this dumping door connection it is apparent that when the body is tilted to discharge its contents, after a predetermined initial swing of said body, the chains of cables 12 will be drawn taut whereby the gate section 9' will first swing up, followed by a backward fold, which action will finally cause the main door section 9 to also swing open and expose the entire discharge mouth of the body to permit the flow of the load therefrom.

Both the longitudinally disposed loading and the discharging doors are positively locked in their closed positions by mechanism comprising a link 13, the free end of which link is arranged to engage a projecting lip 14 that is carried by the related door. The link 13 is hingedly connected to a hand manipulated clamping lever 15, which lever is pivoted to an eared bracket 15' that extends from the juxtaposed side wall 7 of the wagon body. Hence when the door lip is engaged by the free end of the link, the hand-lever 15 being forced downwardly will cause the pivot point of said link to pass under the fulcrum point of the lever to thus effect a drawing lock upon the edge of the door against the edge of the juxtaposed wagon-body side walls. Projecting from the bottom of the body 5 and forwardly of its head end, is a pair of downwardly extended arms 16, to the ends of which arms branches of a flexible body actuating cable or chain 17 are secured.

It should also be understood that while I have shown as an exemplification of my invention a wagon that is particularly adapted for handling garbage, sand, gravel, or like articles, I may, without departing from the spirit of my invention, construct any type of wagon for the various uses wherein any or all of the features of my invention may be applied and I may also utilize the body and its dumping mechanism in connection with a container for cement or other articles requiring a temporary hopper, which hopper must be dumped at predetermined intervals, it being obvious that when the device is utilized in connection with a vehicle of any type it is immaterial whether said vehicle be of the four or two-wheel variety. It should be further understood that, while I have shown as one exemplification of my invention, the body pivoted so as to bring the preponderance of weight forwardly thereof when said body is empty, that the pivot may, in some cases, be centrally disposed whereby the body is balanced when empty, the load being, under these conditions, arranged to present a preponderance of weight forwardly, whereby the action in dumping would be the same as that described in connection with the construction shown in the accompanying drawings.

I claim:—

1. In a vehicle having a truck-frame provided with longitudinally spaced side sills, a rear axle secured thereto, and a body pivoted to the side sills of approximately equal width as the width between said sills; the combination of a suspension frame projecting above the body having struts spaced from the truck-frame sills, and provided with horizontally bowed feet that are secured to said sills, the said feet being partly supported upon the rear axle, a door in hinged connection with the body, and chains or cables connecting the free end of the door and the supporting frame.

2. In a vehicle having a truck-frame provided with longitudinally spaced side sills, a rear axle secured thereto, and a body pivoted to the side sills of approximately equal width as the width between said sills; the combination of a suspension frame projecting above the body having struts spaced from the truck-frame sills, and provided with horizontally bowed feet that are secured to said sills the said feet being partly supported upon the rear axle, a door section in hinged connection with the body, a second door section in hinged connection with the free end of the first mentioned section, and chains or cables connecting the free end of the second door section and supporting frame.

In testimony that I claim the foregoing I have hereunto set my hand at Oshkosh in the county of Winnebago and State of Wisconsin in the presence of two witnesses.

CHARLES G. STREICH.

Witnesses:
E. SCHLUMMER,
H. EILERS.